United States Patent
Bernal et al.

(10) Patent No.: US 9,535,738 B2
(45) Date of Patent: Jan. 3, 2017

(54) MIGRATING VIRTUAL MACHINES BASED ON RELATIVE PRIORITY OF VIRTUAL MACHINE IN THE CONTEXT OF A TARGET HYPERVISOR ENVIRONMENT

(71) Applicant: International Business Machines Corporation, Armonk, NY (US)

(72) Inventors: Edward R. Bernal, Raleigh, NC (US); Saju Mathew, Austin, TX (US); Jose A. Nativio, Cary, NC (US); Aaron J. Quirk, Cary, NC (US); Giovanni Viera, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/678,360

(22) Filed: Apr. 3, 2015

(65) Prior Publication Data

US 2016/0291997 A1    Oct. 6, 2016

(51) Int. Cl.
*G06F 9/455*    (2006.01)
*G06F 9/48*    (2006.01)
*G06F 9/50*    (2006.01)

(52) U.S. Cl.
CPC ......... *G06F 9/45558* (2013.01); *G06F 9/4856* (2013.01); *G06F 9/5077* (2013.01); *G06F 2009/4557* (2013.01)

(58) Field of Classification Search
CPC ............... G06F 9/455; G06F 9/48; G06F 9/50
See application file for complete search history.

(56) References Cited

U.S. PATENT DOCUMENTS

| | | |
|---|---|---|
| 7,257,811 B2 | 8/2007 | Hunt et al. |
| 8,423,646 B2 | 4/2013 | Jamjoom et al. |
| 2012/0011254 A1* | 1/2012 | Jamjoom .............. G06F 9/4856 709/226 |

(Continued)

OTHER PUBLICATIONS

Simon Green, eHow Contributor, "The Difference Between Percent and Percentile", Sep. 15, 2013, www.ehow.com, p. 1, How to Calculate Percentile.*

(Continued)

*Primary Examiner* — Lewis A Bullock, Jr.
*Assistant Examiner* — Bruce S Ashley
(74) *Attorney, Agent, or Firm* — Robert A. Voigt, Jr.; Winstead, P.C.

(57) ABSTRACT

A method, system and computer program product for selecting a target hypervisor to run a migrated virtual machine. An "effective priority value," representing the virtual machine's priority with respect to the other virtual machines running on the same hypervisor, is calculated for the virtual machine when it is running on the source hypervisor as well as if it were to run on a target hypervisor for each possible target hypervisor. The target hypervisor associated with the minimum difference in absolute value terms between the virtual machine's effective priority value calculated when it is running on the source hypervisor and its effective priority value calculated if it were to be migrated to run on a target hypervisor is selected to receive the migrating virtual machine. In this manner, the effective priority metric has enabled a target hypervisor to be chosen that most closely matches the priority environment of the source hypervisor.

12 Claims, 7 Drawing Sheets

(56) References Cited

U.S. PATENT DOCUMENTS

| | | | |
|---|---|---|---|
| 2012/0137001 A1* | 5/2012 | Ferris | H04W 4/003 709/226 |
| 2012/0185848 A1 | 7/2012 | Devarakonda et al. | |
| 2014/0208329 A1 | 7/2014 | Abali et al. | |

OTHER PUBLICATIONS

List of IBM Patents or Patent Applications Treated as Related, Nov. 5, 2015, pp. 1-2.
Mell et al., "The NIST Definition of Cloud Computing," Special Publication 800-145, Sep. 2011, pp. 1-7.
Office Action for U.S. Appl. No. 14/933,406 dated May 27, 2016, pp. 1-38.

* cited by examiner

| HOST 1 |
|---|
| VM A Ep = 33.33 |
| VM B Ep = 66.67 |
| VM C Ep = 0 |

| HOST 2 |
|---|
| VM D Ep = 0 |
| VM E Ep = 66.67 |
| VM F Ep = 33.33 |

VM A MIGRATING FROM HOST 1 TO HOST 2

| HOST 1 |
|---|
| VM B Ep = 50 |
| VM C Ep = 0 |

| HOST 2 |
|---|
| VM A Ep = 25 |
| VM D Ep = 0 |
| VM E Ep = 75 |
| VM F Ep = 50 |

| HYPERVISOR | VM | vCPUs | METRIC | NUMBER OF CPU CLOCK TICKS PER vCPU | NUMBER OF CPU CLOCK TICKS ALLOCATED | TOTAL NUMBER OF CPU CLOCK TICKS | CPU METRIC | EFFECTIVE PRIORITY (Ep) |
|---|---|---|---|---|---|---|---|---|
| HOST 1 | A | 2 | CPU | 10,000 | 20,000 | 12,832 | 0.642 | 33.33 |
|  | B | 1 | CPU | 10,000 | 10,000 | 8,333 | 0.833 | 66.67 |
|  | C | 4 | CPU | 10,000 | 40,000 | 14,111 | 0.353 | 0.00 |
| HOST 2 | D | 1 | CPU | 10,000 | 10,000 | 5,432 | 0.543 | 0 |
|  | E | 1 | CPU | 10,000 | 10,000 | 9,898 | 0.990 | 66.67 |
|  | F | 4 | CPU | 10,000 | 40,000 | 31,267 | 0.782 | 33.33 |

FIG. 6

MIGRATING VIRTUAL MACHINES BASED ON RELATIVE PRIORITY OF VIRTUAL MACHINE IN THE CONTEXT OF A TARGET HYPERVISOR ENVIRONMENT

TECHNICAL FIELD

The present invention relates generally to cloud computing, and more particularly to migrating virtual machines based on the relative priority of the virtual machine in the context of a target hypervisor environment.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as the physical host. The common base portion may be referred to as a hypervisor in which one or more virtual machines in the user portions are run by the hypervisor.

Currently, cloud environment administrators specify priority settings for these virtual machines running on a hypervisor to determine the amount of access they have to the physical resources (e.g., virtual processing unit, memory, network bandwidth). Virtual machines with a higher priority will receive greater access, such as the number of processor cycles, to the physical resources than virtual machines with a lower priority when the physical resource (e.g., virtual processing unit) comes under contention.

In terms of optimizing performance, the cloud computing node should have a good mix of virtual machines running on the cloud computing node with different priority levels. For example, in the scenario where the hypervisor runs 100 virtual machines with the same priority level, no virtual machine can be given additional access to a shared physical resource when the resource comes under contention since every virtual machine has the same priority level. However, if the 100 virtual machines include virtual machines assigned high, medium and low priority levels, the hypervisor has an opportunity to enable those virtual machines with a higher priority level to have greater access to the resource than those virtual machines with a lower priority. In this manner, the resource can be more efficiently utilized.

As a result, the distribution of virtual machines with varying priority levels is an important factor in efficiently utilizing the shared resource. However, when a virtual machine is migrated from one physical host, such as the physical computer of the cloud computing node, to another physical host, the migrated virtual machine may receive a different amount of access to a shared resource on the target physical host than on the source physical host depending on the distribution of priority levels for the other virtual machines running on the target physical host even though the virtual machine's priority level remains the same.

Currently, when a virtual machine is migrated to a target physical host, there is no consideration made to a change in the amount of access by the migrated virtual machine to a shared resource under contention when selecting the target physical host. As a result, the performance levels specified by the administrator may not be maintained.

BRIEF SUMMARY

In one embodiment of the present invention, a method for selecting a target hypervisor to run a migrated virtual machine comprises determining a current resource utilization of virtual machines running on a source hypervisor and two or more target hypervisors. The method further comprises determining an amount of a resource allocated to each virtual machine running on the source hypervisor and the two or more target hypervisors. The method additionally comprises calculating a resource allocation metric value for each virtual machine running on the source hypervisor using the current resource utilization and the amount of the resource allocated for each virtual machine running on the source hypervisor. Furthermore, the method comprises calculating a resource allocation metric value for each virtual machine running on the two or more target hypervisors using the current resource utilization and the amount of the resource allocated for each virtual machine running on the two or more target hypervisors. Additionally, the method comprises calculating, by a processor, an effective priority value for a virtual machine running on the source hypervisor using the resource allocation metric values for each of the virtual machines running on the source hypervisor, where the effective priority value corresponds to a priority of the virtual machine with respect to other virtual machines running on a same hypervisor. In addition, the method comprises calculating, by the processor, an effective priority value for the virtual machine if it were to be migrated to run on a target hypervisor for each of the two or more target hypervisors using the resource allocation metric values for each of the virtual machines running on the target hypervisor. The method further comprises comparing the effective priority value for the virtual machine running on the source hypervisor with its effective priority value if it were to be migrated to the target hypervisor for each of the two or more target hypervisors. The method additionally comprises generating a set of deltas representing differences in absolute value terms between the effective priority value of the virtual machine running on the source hypervisor and its effective priority value if it were to be migrated to run on the target hypervisor for each of the two or more target hypervisors. Furthermore, the method comprises determining a minimum delta in the set of deltas. Additionally, the method comprises selecting one of the two or more target hypervisors associated with the minimum delta to receive the virtual machine to be migrated from the source hypervisor.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 6 illustrates an exemplary illustration of calculating the resource allocation metric value and effective priority values for each virtual machine running on the source hypervisor and a target hypervisor in accordance with an embodiment of the present invention.

DETAILED DESCRIPTION

Figure 1:
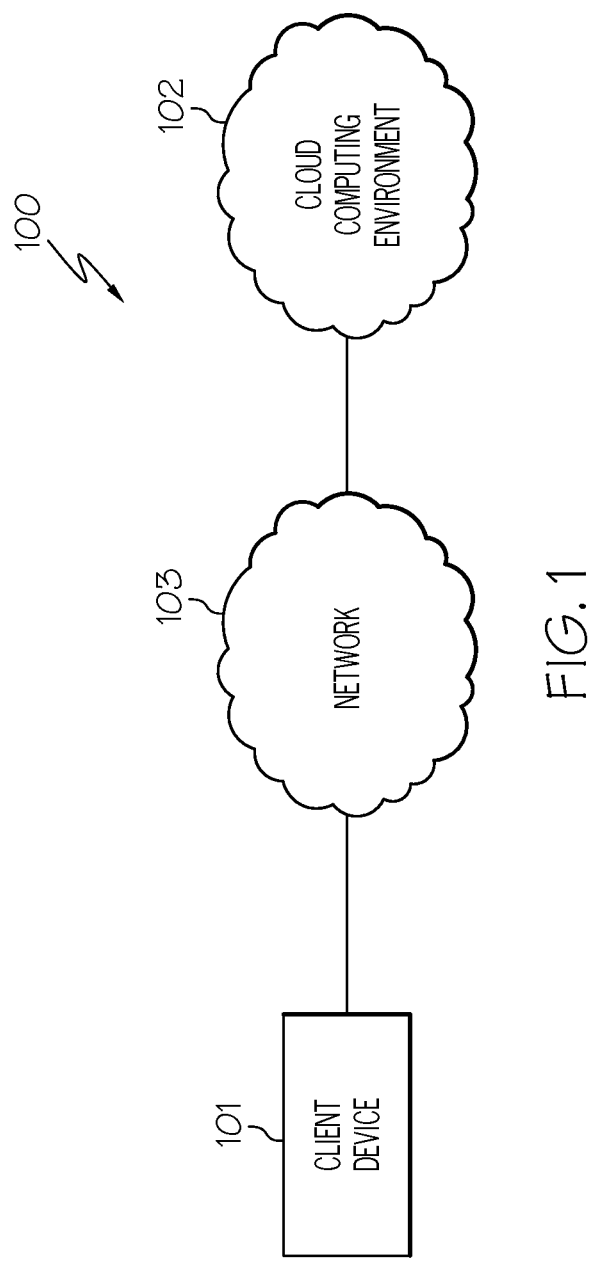
FIG. 1 illustrates a network system in accordance with an embodiment of the present invention.

The present invention comprises a method, system and computer program product for selecting a target hypervisor to run a migrated virtual machine. In one embodiment of the present invention, the current resource utilization of virtual machines running on a source hypervisor and two or more target hypervisors is determined. The "source" hypervisor refers to the hypervisor running a virtual machine that is to be migrated to another cloud computing node. The "target" hypervisor refers to the hypervisor that has the potential for running the migrated virtual machine. The amount of the resource allocated to each virtual machine running on the source hypervisor and two or more target hypervisors is determined. A "resource allocation metric value" is calculated for each virtual machine running on the source hypervisor and the two or more target hypervisors using the current utilization of the resource by the virtual machine and the amount of the resource allocated the virtual machine. An "effective priority value" is calculated for the virtual machine running on the source hypervisor to be migrated using the resource allocation metric values for the virtual machines running on the source hypervisor and the number of virtual machines running on the source hypervisor with a resource allocation metric value less than or equal to the virtual machine's resource allocation metric value and the total number of resource allocation metric values calculated for the virtual machines running on the source hypervisor. The "effective priority value" corresponds to the virtual machine's priority with respect to the other virtual machines running on the same hypervisor. The effective priority value for the virtual machine to be migrated if it were migrated to a target hypervisor is calculated for each of the possible target hypervisors using the resource allocation metric values for the virtual machines running on the target hypervisor and the number of virtual machines running on the target hypervisor with a resource allocation metric value equal to and below the virtual machine's resource allocation metric value and the total number of resource allocation metric values calculated for the virtual machines running on the target hypervisor and for the virtual machine to be migrated. The effective priority value calculated when the virtual machine to be migrated was running on the source hypervisor is compared with its effective priority if it were to be migrated to run on a target hypervisor for each of the target hypervisors. A set of deltas is generated representing the differences in absolute value terms between the effective priority value calculated when the virtual machine to be migrated was running on the source hypervisor with its effective priority if it were to be migrated to run on a target hypervisor for each of the target hypervisors. The target hypervisor associated with the minimum delta is selected to receive the virtual machine to be migrated from the current cloud computing node. In this manner, the effective priority metric has enabled a target hypervisor to be chosen that most closely matches the priority environment of the source hypervisor which currently hosts the virtual machine. As a result, migrating virtual machines to run on target hypervisors will have minimal impact on the access to the shared resource defined by the priority configuration. In this manner, the performance levels specified by the administrator may be maintained by migrating virtual machines based on a relative priority of the virtual machine in the context of the target hypervisor environment.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
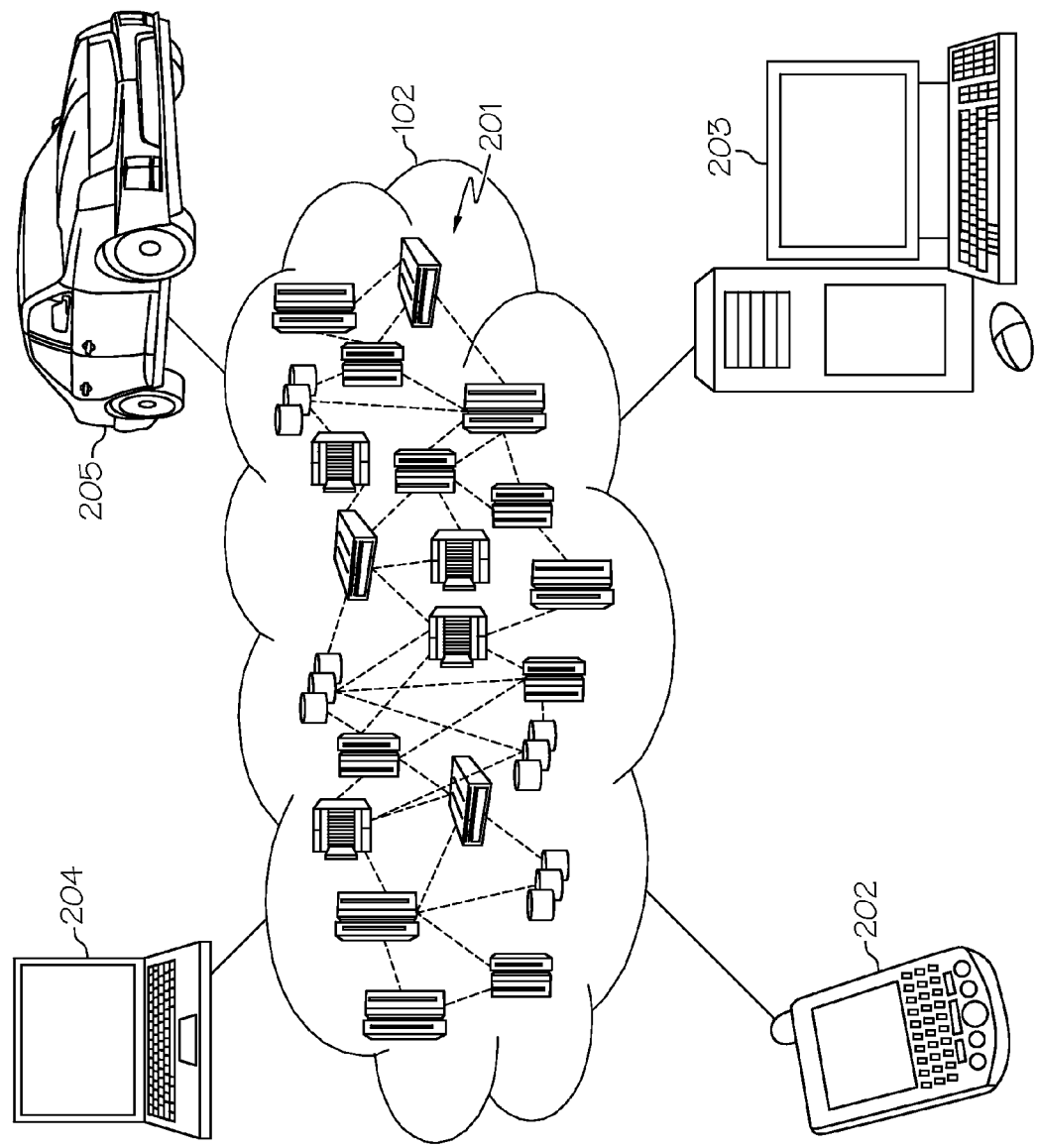
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
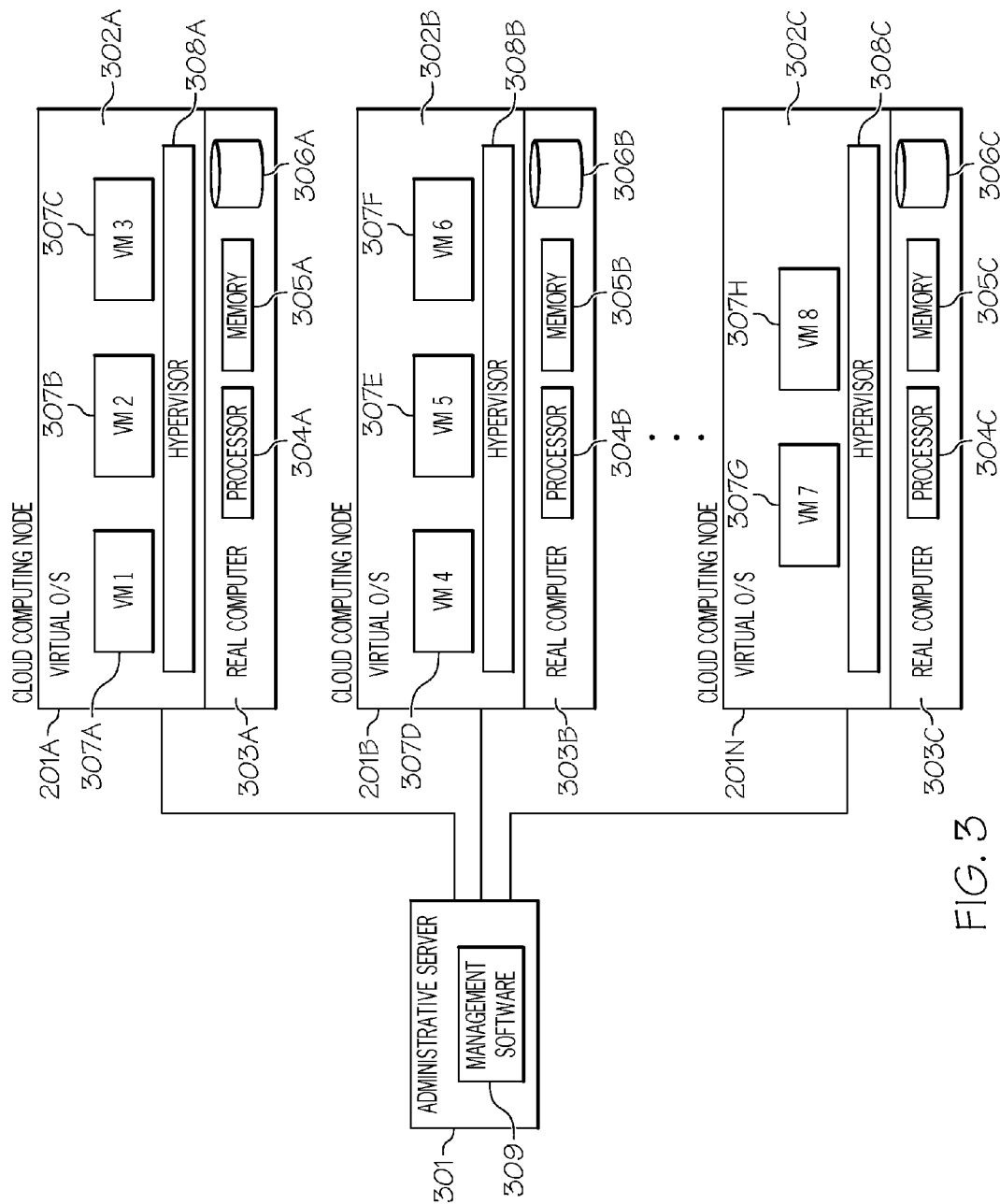
FIG. 3 illustrates cloud computing nodes in a virtualized computer environment in accordance with an embodiment of the present invention.

Referring now to FIG. 3, FIG. 3 illustrates cloud computing nodes 201A-201N, where N is a positive integer number, in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center. A description of the hardware configuration of administrative server 301 is provided further below in connection with FIG. 4.

With reference now to cloud computing node 201A, cloud computing node 201A includes a virtual operating system 302A. Virtual operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes one or more virtual machines 307A-307C (identified as "VM 1," "VM 2" and "VM 3," respectively, in FIG. 3) that are run by a hypervisor 308A. Hypervisor 308A may be implemented in microcode running on processor 304A or it may be implemented in software as part of virtual operating system 302A.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N may be configured similarly as previously discussed cloud computing node 201A. For example, cloud computing nodes 201B, 201N are configured similarly as cloud computing node 201A. For instance, cloud computing node 201B includes a virtual operating system 302B executing on a real or physical computer 303B. Real computer 303B includes one or more processors 304B, a memory 305B (also referred to herein as the host physical memory), one or more disk drives 306B and the like. Furthermore, virtual operating system 302B includes one or more virtual machines 307D-307F (identified as "VM 4," "VM5," and "VM6," respectively, in FIG. 3) that are run by a hypervisor 308B.

In another example, cloud computing node 201N includes a virtual operating system 302C executing on a real or physical computer 303C. Real computer 303C includes one or more processors 304C, a memory 305C (also referred to herein as the host physical memory), one or more disk drives 306C and the like. Furthermore, virtual operating system 302C includes one or more virtual machines 307G-307H (identified as "VM7" and "VM8," respectively, in FIG. 3) that are run by a hypervisor 308C.

Virtual machines 307A-307H may collectively or individually be referred to as virtual machines 307 or virtual machine 307, respectively. Hypervisors 308A-308C may collectively or individually be referred to as hypervisors 308 or hypervisor 308, respectively.

FIG. 3 is not to be limited in scope to a particular number of cloud computing nodes 201 and each cloud computing node 201 may include any number of virtual machines 307, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 309, that can be used to monitor system utilization, intelligently deploy images of data and optimize the operations of cloud computing environment 102.

Figure 5A:
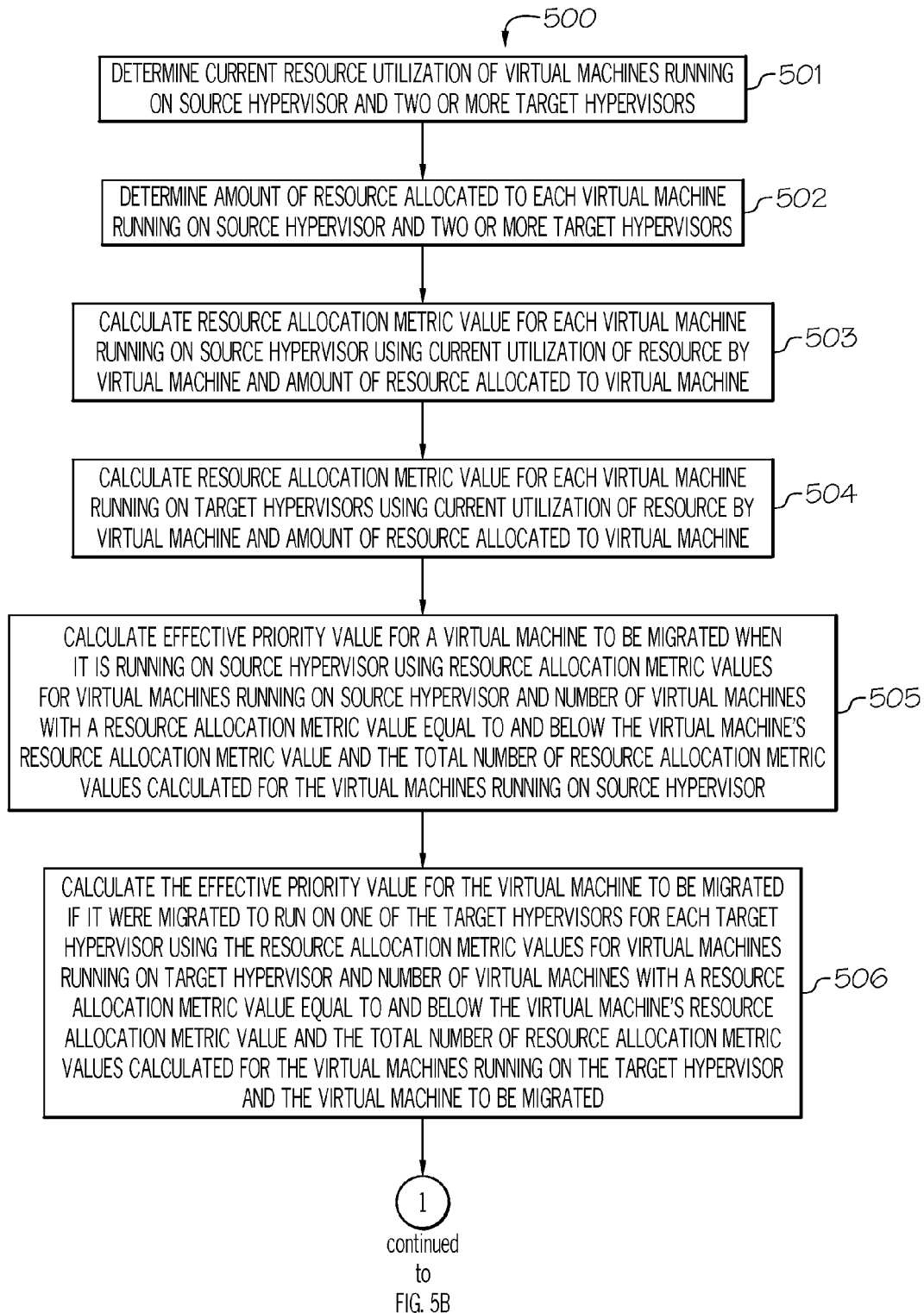
FIGS. 5A-5B are a flowchart of a method for migrating virtual machines based on a relative priority of the virtual machine in the context of the target hypervisor environment in accordance with an embodiment of the present invention.
Figure 5B:
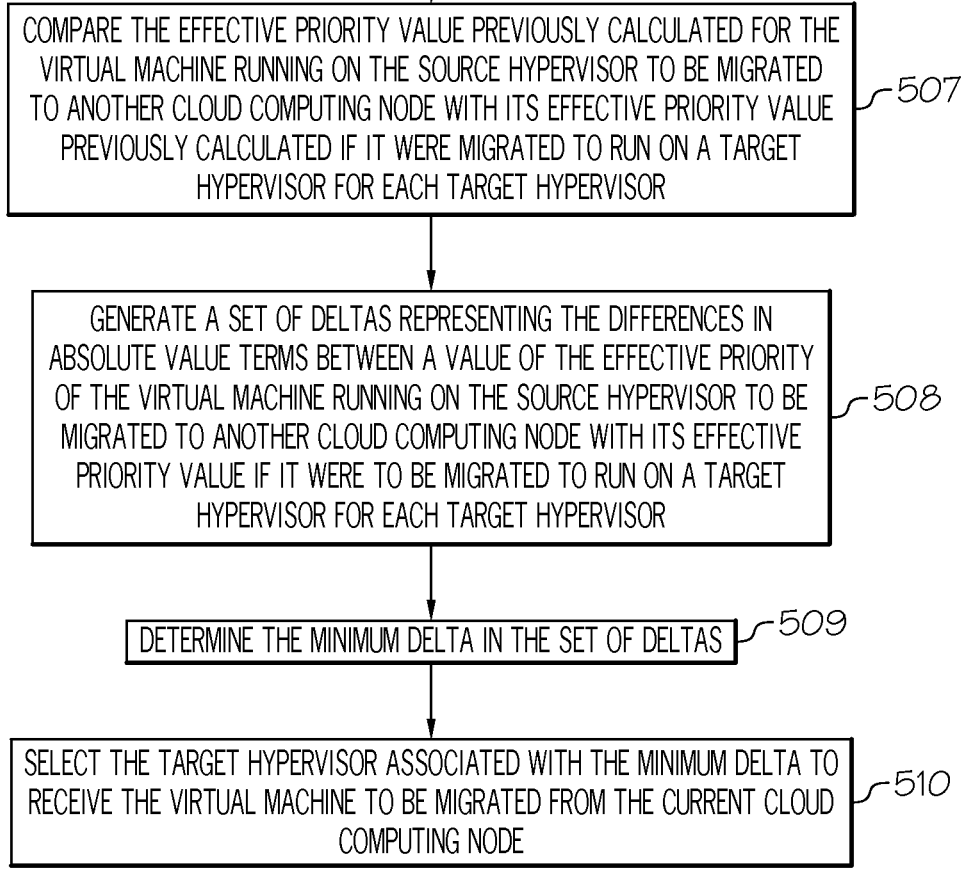

Management software 309 is further configured to migrate virtual machines 307 based on a relative priority (priority relative to other virtual machines 307 running on the same hypervisor 308 as virtual machine 307 in question) of the virtual machine 307 in the context of a target hypervisor environment (e.g., migrate virtual machine 307A running on hypervisor 308A on cloud computing node 201A to run on hypervisor 308B on cloud computing node 201B) in order to maintain the performance levels specified by the administrator as discussed further below in connection with FIGS. 5A-5B and 6.

Figure 4:
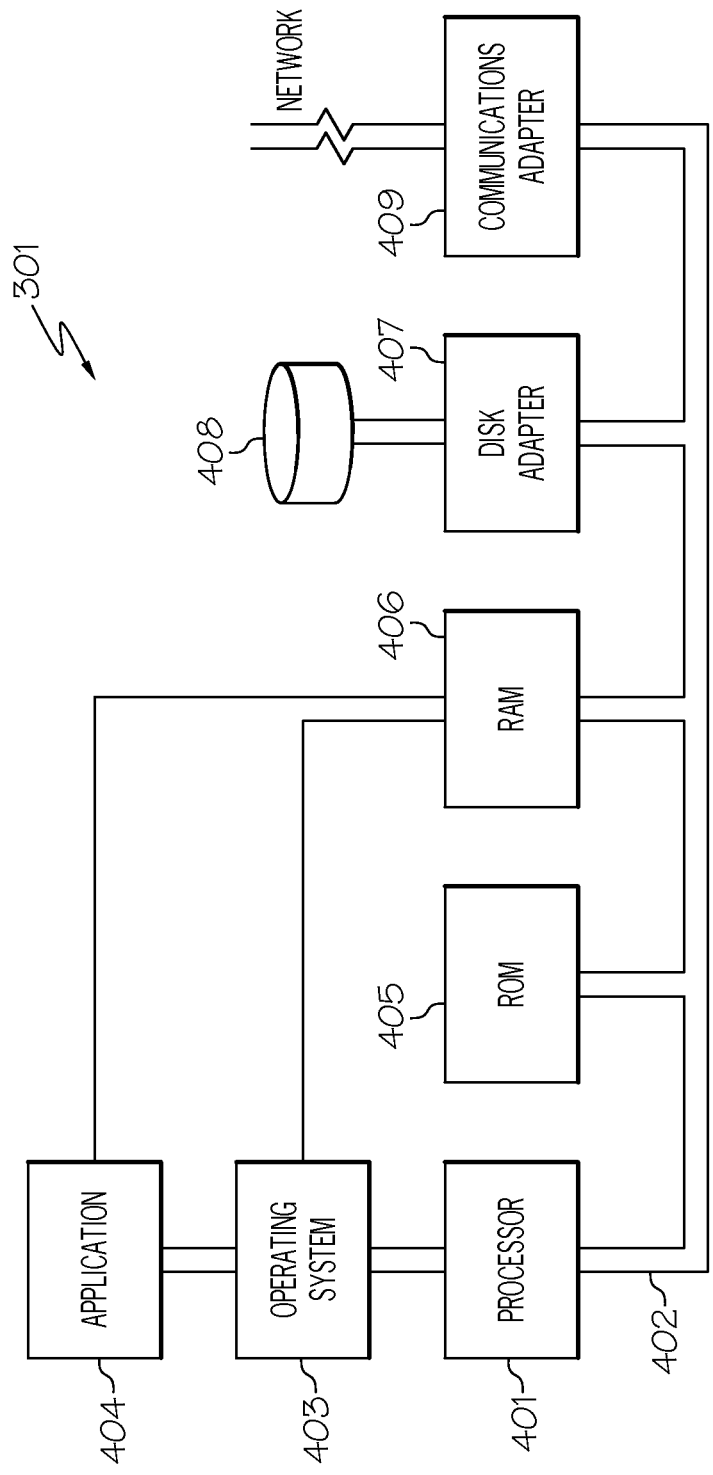
FIG. 4 illustrates a hardware configuration of an administrative server in accordance with an embodiment of the present invention.

Referring now to FIG. 4, FIG. 4 illustrates a hardware configuration of administrative server 301 (FIG. 3) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 309 of FIG. 3) for migrating virtual machines 307 based on a relative priority of the virtual machine 307 in the context of a target hypervisor environment in order to maintain the performance levels specified by the administrator as discussed further below in connection with FIGS. 5A-5B and 6.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for migrating virtual machines 307 based on a relative priority of the virtual machine 307 in the context of a target hypervisor environment in order to maintain the performance levels specified by the administrator, as discussed further below in connection with FIGS. 5A-5B and 6, may reside in disk unit 408 or in application 404.

Administrative server 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, cloud environment administrators specify priority settings for these virtual machines running on a hypervisor to determine the amount of access they have to the physical resources (e.g., virtual processing unit, memory, network bandwidth). Virtual machines with a higher priority will receive greater access, such as the number of processor cycles, to the physical resources than virtual machines with a lower priority when the physical resource (e.g., virtual processing unit) comes under contention. In terms of optimizing performance, the cloud computing node should have a good mix of virtual machines running on the cloud computing node with different priority levels. For example, in the scenario where the hypervisor runs 100 virtual machines with the same priority level, no virtual machine can be given additional access to a shared physical resource when the resource comes under contention since every virtual machine has the same priority level. However, if the 100 virtual machines include virtual machines assigned high, medium and low priority levels, the hypervisor has an opportunity to enable those virtual machines with a higher priority level to have greater access to the resource than those virtual machines with a lower priority. In this manner, the resource can be more efficiently utilized. As a result, the distribution of virtual machines with varying priority levels is an important factor in efficiently utilizing the shared resource. However, when a virtual machine is migrated from one physical host, such as the physical computer of the cloud computing node, to another physical host, the migrated virtual machine may receive a different amount of access to a shared resource on the target physical host than on the source physical host depending on the distribution of priority levels for the other virtual machines running on the target physical host even though the virtual machine's priority level remains the same. Currently, when a virtual machine is migrated to a target physical host, there is no consideration made to a change in the amount of access by the migrated virtual machine to a shared resource under contention when selecting the target physical host. As a result, the performance levels specified by the administrator may not be maintained.

The principles of the present invention provide a means for maintaining the performance levels specified by the administrator by migrating virtual machines based on a relative priority of the virtual machine in the context of the target hypervisor environment as discussed below in connection with FIGS. 5A-5B and 6. FIGS. 5A-5B are a flowchart of a method for migrating virtual machines 307 (e.g., virtual machine 307A running on hypervisor 308A of FIG. 3) based on a relative priority of the virtual machine 307 (e.g., virtual machine 307A) in the context of the target hypervisor environment (e.g., environment of hypervisor 308B of FIG. 3). FIG. 6 illustrates an exemplary illustration of calculating the resource allocation metric value (central processing unit (CPU) metric value) for each virtual machine 307 running on the source hypervisor 308 (e.g., hypervisor 308A) and a target hypervisor 308 (e.g., hypervisor 308B).

As stated above, FIGS. 5A-5B are a flowchart of a method 500 for migrating virtual machines 307 (e.g., virtual machine 307A running on hypervisor 308A of FIG. 3) based on a relative priority of the virtual machine 307 (e.g., virtual machine 307A) in the context of the target hypervisor environment (e.g., environment of hypervisor 308B of FIG. 3) in accordance with an embodiment of the present invention.

Referring to FIG. 5A, in conjunction with FIGS. 1-4, in step 501, administrative server 301 determines the current resource utilization of virtual machines 307 running on a source hypervisor 308 (e.g., hypervisor 308A) and two or more target hypervisors 308 (e.g., hypervisors 308B, 308C). The "current" or "source" hypervisor 308 refers to the hypervisor 308 running a virtual machine 307 that is to be migrated to another cloud computing node 201. The "target" hypervisor 308 refers to the hypervisor 308 that has the potential for running the migrated virtual machine 307. For example, with respect to virtual machine 307A, virtual machine 307A is said to be running on source hypervisor 308A with the potential of being migrated to run on target hypervisor 308B. "Resource utilization," as used herein, refers to the utilization rate of a resource, such as the processing unit (e.g., virtual processing unit), memory, network bandwidth, etc. For example, the resource utilization may refer to the number of processing unit clock ticks utilized by virtual machine 307.

In step 502, administrative server 301 determines the amount of the resource allocated to each virtual machine 307 running on the source hypervisor 308 (e.g., hypervisor 308A) and two or more target hypervisors 308 (e.g., hypervisors 308B, 308C). As discussed above, each virtual machine 307 may be assigned a priority level corresponding to the amount of access virtual machine 307 has to a resource. For example, virtual machine 307 may be allotted a particular number of processing unit clock ticks.

In step 503, administrative server 301 calculates the "resource allocation metric value" for each virtual machine 307 running on the source hypervisor 308 (e.g., hypervisor 308A) using the current utilization of the resource by virtual machine 307 (obtained in step 501) and the amount of the resource allocated to virtual machine 307 (obtained in step 502). In one embodiment, the resource allocation metric value corresponds to the current utilization of the resource by virtual machine 307 divided by the amount of the resource allocated to virtual machine 307. For example, referring to FIG. 6, FIG. 6 illustrates an exemplary illustration of calculating the resource allocation metric value (central processing unit (CPU) metric value) for each virtual machine 307 running on the source hypervisor 308 (e.g., hypervisor 308A) and a target hypervisor 308 (e.g., hypervisor 308B) in accordance with an embodiment of the present invention. As illustrated in FIG. 6, the current utilization of the resource, such as a virtual processing unit, by virtual machines 307A-307C (identified as "A," "B" and "C" in FIG. 6) running on hypervisor 308A (identified as "Host 1" in FIG. 6) corresponds to 12,832 CPU clock ticks, 8,333 CPU clock ticks and 14,111 CPU clock ticks, respectively. In the example of FIG. 6, virtual machine 307A utilizes 2 virtual central processing units, virtual machine 307B utilizes a single virtual central processing unit and virtual machine 307C utilizes 4 virtual central processing units. As also illustrated in FIG. 6, virtual machine 307A is allocated 20,000 CPU clock ticks, virtual machine 307B is allocated 10,000 CPU clock ticks and virtual machine 307C is allocated 40,000 CPU clock ticks. As discussed above, the resource allocation metric value ("CPU metric value" in the example of FIG. 6) corresponds to the amount of the resource allocated to virtual machine 307 divided by the current utilization of the resource by virtual machine 307. Hence, the CPU metric value for virtual machine 307A corresponds to a CPU metric value of 0.642 (12,832 CPU clock ticks/20,000 CPU clock ticks). Similarly, the CPU metric value for virtual machine 307B corresponds to a CPU metric value of 0.833 (8,333 CPU clock ticks/10,000 CPU clock ticks). Furthermore, the CPU metric value for virtual machine 307C corresponds to a CPU metric value of 0.353 (14,111 CPU clock ticks/40,000 CPU clock ticks).

Returning to FIG. 5A, in conjunction with FIGS. 1-4 and 6, in step 504, administrative server 301 calculates the resource allocation metric value for each virtual machine 307 (e.g., virtual machines 307D-307H) running on target hypervisors 308 (e.g., hypervisors 308B, 308C) using the current utilization of the resource by virtual machine 307 (obtained in step 501) and the amount of the resource allocated to virtual machine 307 (obtained in step 502).

As discussed above, the resource allocation metric corresponds to the current utilization of the resource by virtual machine 307 divided by the amount of the resource allocated to virtual machine 307. For example, referring to FIG. 6, the current utilization of the resource, such as a virtual processing unit, by virtual machines 307D-307F (identified as "D,"

"E" and "F" in FIG. 6) running on a target hypervisor 308 (e.g., hypervisor 308B which is identified as "Host 2" in FIG. 6) corresponds to 5,432 CPU clock ticks, 9,898 CPU clock ticks and 31,267 CPU clock ticks, respectively. In the example of FIG. 6, virtual machine 307D utilizes a single virtual central processing unit, virtual machine 307E utilizes a single virtual central processing unit and virtual machine 307F utilizes 4 virtual central processing units. As also illustrated in FIG. 6, virtual machine 307D is allocated 10,000 CPU clock ticks, virtual machine 307E is allocated 10,000 CPU clock ticks and virtual machine 307F is allocated 40,000 CPU clock ticks. As discussed above, the resource allocation metric value ("CPU metric value" in the example of FIG. 6) corresponds to the amount of the resource allocated to virtual machine 307 divided by the current utilization of the resource by virtual machine 307. Hence, the CPU metric value for virtual machine 307D corresponds to a CPU metric value of 0.543 (5,432 CPU clock ticks/10,000 CPU clock ticks). Similarly, the CPU metric value for virtual machine 307E corresponds to a CPU metric value of 0.990 (9,898 CPU clock ticks/10,000 CPU clock ticks). Furthermore, the CPU metric value for virtual machine 307F corresponds to a CPU metric value of 0.782 (31,267 CPU clock ticks/40,000 CPU clock ticks). While FIG. 6 illustrates calculating the resource allocation metric value for each virtual machine 307 running on target hypervisor 308B, it will be apparent to those skilled in the art that the same process may be applied to calculate the resource allocation metric value for each virtual machine 307 running on other target hypervisors 308.

Returning to FIG. 5A, in conjunction with FIGS. 1-4 and 6, in step 505, administrative server 301 calculates the "effective priority value" for the virtual machine 307 to be migrated (e.g., virtual machine 307A) running on the source hypervisor 308 (e.g., hypervisor 308A) using the resource allocation metric values (calculated in step 503) for the virtual machines 307 running on the source hypervisor 308 (e.g., hypervisor 308A) and the number of virtual machines 307 running on the source hypervisor 308 with a resource allocation metric value equal to and below the virtual machine's resource allocation metric value and the total number of resource allocation metric values calculated for the virtual machines 307 running on the source hypervisor 308 (e.g., hypervisor 308A). The "effective priority value," as used herein, corresponds to the virtual machine's 307 priority with respect to the other virtual machines 307 running on the same hypervisor 308.

In one embodiment, the "effective priority value" is obtained using the following equation (EQ 1):

$$E_p=((b+0.5e)/n)*100 \quad (EQ\ 1)$$

where $E_p$ corresponds to the effective priority value for a virtual machine 307 (e.g., virtual machine 307A), b corresponds to a number of the resource allocation metric values calculated for the other virtual machines 307 running on the same hypervisor 308 (e.g., hypervisor 308A) as the virtual machine 307 (e.g., virtual machine 307A) with a value below the resource allocation metric value calculated for the virtual machine 307 in question (e.g., virtual machine 307A), e corresponds to a number of the resource allocation metric values calculated for the other virtual machines 307 running on the same hypervisor 308 (e.g., hypervisor 308A) as the virtual machine 307 (e.g., virtual machine 307A) with a value equal to the resource allocation metric value calculated for the virtual machine 307 in question (e.g., virtual machine 307A), and n corresponds to a total number of resource allocation metric values calculated for virtual machines 307 running on the same hypervisor 308 as the virtual machine 307 in question.

For example, referring to FIG. 6 and Equation (EQ 1), if virtual machine 307A is to be migrated, then its effective priority value $E_p$, may be calculated as follows. The effective priority value $E_p$ for virtual machine 307A running on hypervisor 308A corresponds to 33.33 (((1+0)/3)*100), where b is equal to 1 (virtual machine 307C has a CPU metric value of 0.353 which is less than virtual machine's 307A CPU metric value of 0.642), e is equal to 0 (no other virtual machine 307 has a CPU metric value that is equal to virtual machine's 307A CPU metric value of 0.642) and n is equal to 3 (there are 3 CPU metric values calculated for virtual machines 307A-307C running on hypervisor 308A).

FIG. 6 also illustrates calculating the effective priority value $E_p$ for the other virtual machines 307 running on the source hypervisor 308. As illustrated in FIG. 6, the effective priority value $E_p$ for virtual machine 307B running on hypervisor 308A corresponds to 66.67 (((2+0)/3)*100), where b is equal to 2 (virtual machine 307A has a CPU metric value of 0.642 and virtual machine 307C has a CPU metric value of 0.353 which are both below virtual machine's 307B CPU metric value of 0.833), e is equal to 0 (no other virtual machine 307 has a CPU metric value that is equal to virtual machine's 307B CPU metric value of 0.833) and n is equal to 3 (there are 3 CPU metric values calculated for virtual machines 307A-307C running on hypervisor 308A).

Furthermore, the effective priority value $E_p$ for virtual machine 307C running on hypervisor 308A corresponds to 0 (((0+0)/3)*100), where b is equal to 0 (none of the virtual machines 307 have a CPU metric value with a value below virtual machine's 307C CPU metric value of 0.353), e is equal to 0 (no other virtual machine 307 has a CPU metric value that is equal to virtual machine's 307C CPU metric value of 0.353) and n is equal to 3 (there are 3 CPU metric values calculated for virtual machines 307A-307C running on hypervisor 308A).

FIG. 6 further illustrates calculating the effective priority value $E_p$ for each virtual machine running on a target hypervisor 308 (e.g., hypervisor 308B) using Equation (EQ 1).

For example, the effective priority value $E_p$ for virtual machine 307D running on hypervisor 308B corresponds to 0 (((0+0)/3)*100), where b is equal to 0 (none of the virtual machines 307 have a CPU metric value with a value below virtual machine's 307D CPU metric value of 0.543), e is equal to 0 (no other virtual machine 307 has a CPU metric value that is equal to virtual machine's 307D CPU metric value of 0.543) and n is equal to 3 (there are 3 CPU metric values calculated for virtual machines 307D-307F running on hypervisor 308B).

The effective priority value $E_p$ for virtual machine 307E running on hypervisor 308B corresponds to 66.67 (((2+0)/3)*100), where b is equal to 2 (virtual machine 307D has a CPU metric value of 0.543 and virtual machine 307F has a CPU metric value of 0.782 which are both below virtual machine's 307E CPU metric value of 0.990), e is equal to 0 (no other virtual machine 307 has a CPU metric value that is equal to virtual machine's 307E CPU metric value of 0.990) and n is equal to 3 (there are 3 CPU metric values calculated for virtual machines 307D-307F running on hypervisor 308B).

Furthermore, the effective priority value $E_p$ for virtual machine 307F running on hypervisor 308B corresponds to 33.33 (((0+0)/3)*100), where b is equal to 1 (virtual machine 307D has a CPU metric value of 0.543 which is below virtual machine's 307F CPU metric value of 0.782), e is equal to 0 (no other virtual machine 307 has a CPU metric value that is equal to virtual machine's 307F CPU metric value of 0.782) and n is equal to 3 (there are 3 CPU metric values calculated for virtual machines 307D-307F running on hypervisor 308B).

Returning to FIG. 5A, in conjunction with FIGS. 1-4 and 6, in step 506, administrative server 301 calculates the effective priority value for the virtual machine 307 to be migrated (e.g., virtual machine 307A) if it were migrated to one of the target hypervisors 308 (e.g., hypervisors 308B, 308C) for each of the target hypervisors 308 using the resource allocation metric values (calculated in step 504) for the virtual machines 307 running on target hypervisor 308 and the number of virtual machines 307 running on target hypervisor 308 with a resource allocation metric value equal to and below the virtual machine's resource allocation metric value and the total number of resource allocation metric values calculated for virtual machines 307 running on the target hypervisor 308 (e.g., hypervisors 308B, 308C) and for the virtual machine 307 to be migrated.

For example, referring to FIG. 6 and Equation (EQ 1), the effective priority value $E_p$ for virtual machine 307A if it were to be migrated to cloud computing node 201B to run on hypervisor 308B corresponds to 25 (((1+0)/4)*100), where b is equal to 1 (virtual machine 307D has a CPU metric value of 0.543 which is below virtual machine's 307A CPU metric value of 0.642), e is equal to 0 (no other virtual machine 307 has a CPU metric value that is equal to virtual machine's 307A CPU metric value of 0.642) and n is equal to 4 (there are 4 CPU metric values calculated for virtual machines 307A and 307D-307F).

FIG. 6 also illustrates calculating the effective priority value $E_p$ for the other virtual machines 307 running on target hypervisor 308 (e.g., target hypervisor 308B) if virtual machine 307A were migrated to be run on target hypervisor 308B. The effective priority value $E_p$ for virtual machine 307D if virtual machine 307A were migrated to cloud computing node 201B to run on hypervisor 308B would correspond to 0 (((0+0)/4)*100), where b is equal to 0 (none of the virtual machines 307 have a CPU metric value with a value below virtual machine's 307D CPU metric value of 0.543), e is equal to 0 (no other virtual machine 307 has a CPU metric value that is equal to virtual machine's 307D CPU metric value of 0.532) and n is equal to 4 (there are 4 CPU metric values calculated for virtual machines 307A and 307D-307F).

Furthermore, as illustrated in FIG. 6, the effective priority value $E_p$ for virtual machine 307E if virtual machine 307A were migrated to cloud computing node 201B to run on hypervisor 308B would correspond to 75 (((3+0)/4)*100), where b is equal to 3 (virtual machine 307A has a CPU metric value of 0.642, virtual machine 307D has a CPU metric value of 0.543 and virtual machine 307F has a CPU metric value of 0.782 which are below virtual machine's 307E CPU metric value of 0.990), e is equal to 0 (no other virtual machine 307 has a CPU metric value that is equal to virtual machine's 307E CPU metric value of 0.990) and n is equal to 4 (there are 4 CPU metric values calculated for virtual machines 307A and 307D-307F).

Additionally, as illustrated in FIG. 6, the effective priority value $E_p$ for virtual machine 307F if virtual machine 307A were migrated to cloud computing node 201B to run on hypervisor 308B would correspond to 50 (((2+0)/4)*100), where b is equal to 2 (virtual machine 307A has a CPU metric value of 0.642 and virtual machine 307D has a CPU metric value of 0.543 which are both below virtual machine's 307F CPU metric value of 0.782), e is equal to 0 (no other virtual machine 307 has a CPU metric value that is equal to virtual machine's 307F CPU metric value of 0.782) and n is equal to 4 (there are 4 CPU metric values calculated for virtual machines 307A and 307D-307F).

As also illustrated in FIG. 6, the effective priority value $E_p$ for virtual machine 307B running on hypervisor 308A if virtual machine 307A were migrated to cloud computing node 201B to run on hypervisor 308B would correspond to 50 (((1+0)/2)*100), where b is equal to 1 (virtual machine 307C has a CPU metric value of 0.353 which is below virtual machine's 307B CPU metric value of 0.833), e is equal to 0 (no other virtual machine 307 has a CPU metric value that is equal to virtual machine's 307B CPU metric value of 0.833) and n is equal to 2 (there are 2 CPU metric values calculated for virtual machines 307B and 307C running on hypervisor 308A if virtual machine 307A were migrated to another cloud computing node 201).

Furthermore, as illustrated in FIG. 6, the effective priority value $E_p$ for virtual machine 307C running on hypervisor 308A if virtual machine 307A were migrated to cloud computing node 201B to run on hypervisor 308B would correspond to 0 (((0+0)/2)*100), where b is equal to 0 (none of the virtual machines 307 have a CPU metric value with a value below virtual machine's 307C CPU metric value of 0.353), e is equal to 0 (no other virtual machine 307 has a CPU metric that is equal to virtual machine's 307C CPU metric value of 0.353) and n is equal to 2 (there are 2 CPU metric values calculated for virtual machines 307B and 307C running on hypervisor 308A if virtual machine 307A were migrated to another cloud computing node 201).

Referring now to FIG. 5B, in conjunction with FIGS. 1-4 and 6, in step 507, administrative server 301 compares the effective priority value calculated in step 505 of the virtual machine 307 (e.g., virtual machine 307A) running on the source hypervisor 308 (e.g., hypervisor 308A) to be migrated to another cloud computing node 201 with its effective priority value calculated in step 506 if it were to be migrated to run on a target hypervisor 308 for each target hypervisor 308 (e.g., hypervisors 308B, 308C).

In step 508, administrative server 301 generates a set of deltas representing the differences in absolute value terms between a value of the effective priority value (calculated in step 505) of the virtual machine 307 running on the source hypervisor 308 (e.g., hypervisor 308A) to be migrated to another cloud computing node 201 with its effective priority value (calculated in step 506) if it were to be migrated to run on a target hypervisor 308 (e.g., hypervisor 308B) for each target hypervisor (e.g., hypervisors 308B, 308C). For example, if virtual machine 307A is to be migrated, then administrative server 301 generates a delta for each target hypervisor 308 (e.g., hypervisors 308B, 308C) representing the difference in absolute value terms between a value of the effective priority value of virtual machine 307A when running on the source hypervisor 308A (e.g., 33.33) and the effective priority value of virtual machine 307A running on that target hypervisors 308 (e.g., virtual machine 307A has an effective priority value of 25 if it were to be migrated to run on target hypervisor 308B). In the example of virtual machine 307A migrating to run on target hypervisor 308B, the delta would be 8.33 (33.33−25). The set of deltas would include the deltas computed for the other target hypervisors 308 (e.g., hypervisor 308C).

In step 509, administrative server 301 determines the minimum delta in the set of deltas.

In step 510, administrative server 301 selects the target hypervisor 308 (e.g., target hypervisor 308B) associated with the minimum delta to receive the virtual machine 307 (e.g., virtual machine 307A) to be migrated from current cloud computing node 201 (e.g., cloud computing node 201A). The effective priority metric has enabled a target hypervisor 308 (e.g., hypervisor 308B) to be chosen that most closely matches the priority environment of the source hypervisor 308 (e.g., hypervisor 308A) which currently hosts virtual machine 307 (e.g., virtual machine 307A). As a result, migrating virtual machines 307 (e.g., virtual machine 307A) to run on target hypervisors 308 (e.g., hypervisor 308B) will have minimal impact on the access to the shared resource defined by the priority configuration.

In this manner, the performance levels specified by the administrator may be maintained by migrating virtual machines 307 based on a relative priority of virtual machine 307 in the context of the target hypervisor environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for selecting a target hypervisor to run a migrated virtual machine, the computer program product comprising a computer readable storage medium having program code embodied therewith, the program code comprising the programming instructions for:

determining a current resource utilization of virtual machines running on a source hypervisor and two or more target hypervisors;

determining an amount of a resource allocated to each virtual machine running on said source hypervisor and said two or more target hypervisors;

calculating a resource allocation metric value for each virtual machine running on said source hypervisor using said current resource utilization and said amount of said resource allocated for each virtual machine running on said source hypervisor;

calculating a resource allocation metric value for each virtual machine running on said two or more target hypervisors using said current resource utilization and said amount of said resource allocated for each virtual machine running on said two or more target hypervisors;

calculating an effective priority value for a virtual machine running on said source hypervisor using said resource allocation metric values for each of said virtual machines running on said source hypervisor, wherein said effective priority value corresponds to a priority of said virtual machine with respect to other virtual machines running on a same hypervisor;

calculating an effective priority value for said virtual machine if it were to be migrated to run on a target hypervisor for each of said two or more target hypervisors using said resource allocation metric values for each of said virtual machines running on said target hypervisor;

comparing said effective priority value for said virtual machine running on said source hypervisor with its effective priority value if it were to be migrated to said target hypervisor for each of said two or more target hypervisors;

generating a set of deltas representing differences in absolute value terms between said effective priority value of said virtual machine running on said source hypervisor and its effective priority value if it were to be migrated to run on said target hypervisor for each of said two or more target hypervisors;

determining a minimum delta in said set of deltas;

selecting one of said two or more target hypervisors associated with said minimum delta; and migrating said virtual machine from said source hypervisor to said selected target hypervisor;

wherein said effective priority value for said virtual machine running on said source hypervisor is computed using the following equation:

$$Ep=((b+0.5e)/n)*100,$$

where Ep corresponds to said effective priority value, b corresponds to a number of said resource allocation metric values calculated for other virtual machines running on said source hypervisor with a value less than said resource allocation metric value calculated for said virtual machine running on said source hypervisor, e corresponds to a number of said resource allocation metric values calculated for said other virtual machines running on said source hypervisor with a value equal to said resource allocation metric value calculated for said virtual machine running on said source hypervisor and n corresponds to a total number of resource allocation metric values calculated for said virtual machines running on said source hypervisor.

2. The computer program product as recited in claim 1, wherein said effective priority value for said virtual machine if it were to be migrated to run on said target hypervisor is computed using the following equation:

$$Ep=((b+0.5e)/n)*100,$$

where Ep corresponds to said effective priority value, b corresponds to a number of said resource allocation metric values calculated for other virtual machines running on said target hypervisor with a value less than said resource allocation metric calculated for said virtual machine, e corresponds to a number of said resource allocation metric values calculated for said virtual machines running on said target hypervisor equal in value to said resource allocation metric calculated for said virtual machine and n corresponds to a total number of resource allocation metric values calculated for said virtual machines running on said target hypervisor and said virtual machine.

3. The computer program product as recited in claim 1, wherein the program code further comprises the programming instructions for:

calculating said effective priority value for said virtual machine running on said source hypervisor using said resource allocation metric values for said virtual machines running on said source hypervisor, a number of virtual machines running on said source hypervisor with a resource allocation metric value equal to and below said virtual machine's resource allocation metric value and said total number of resource allocation metric values calculated for said virtual machines running on said source hypervisor.

4. The computer program product as recited in claim 1, wherein the program code further comprises the programming instructions for:

calculating said effective priority value for said virtual machine if it were to be migrated to run on said target hypervisor using said resource allocation metric values for said virtual machines running on said target hypervisor, a number of virtual machines running on said target hypervisor with a resource allocation metric value equal to and below said virtual machine's resource allocation metric value and a total number of resource allocation metric values calculated for said virtual machines running on said target hypervisor and said virtual machine to be migrated to run on said target hypervisor.

5. The computer program product as recited in claim 1, wherein said source hypervisor resides on a first cloud computing node of a cloud computing environment and said two or more hypervisors reside on two or more other cloud computing nodes of said cloud computing environment.

6. The computer program product as recited in claim 1, wherein said resource comprises one of the following: processing unit, memory and network bandwidth.

7. A system, comprising:
a memory unit for storing a computer program for selecting a target hypervisor to run a migrated virtual machine; and
a processor coupled to the memory unit, wherein the processor is configured to execute the program instructions of the computer program comprising:
determining a current resource utilization of virtual machines running on a source hypervisor and two or more target hypervisors;
determining an amount of a resource allocated to each virtual machine running on said source hypervisor and said two or more target hypervisors;
calculating a resource allocation metric value for each virtual machine running on said source hypervisor using said current resource utilization and said amount of said resource allocated for each virtual machine running on said source hypervisor;
calculating a resource allocation metric value for each virtual machine running on said two or more target hypervisors using said current resource utilization and said amount of said resource allocated for each virtual machine running on said two or more target hypervisors;
calculating an effective priority value for a virtual machine running on said source hypervisor using said resource allocation metric values for each of said virtual machines running on said source hypervisor, wherein said effective priority value corresponds to a priority of said virtual machine with respect to other virtual machines running on a same hypervisor;
calculating an effective priority value for said virtual machine if it were to be migrated to run on a target hypervisor for each of said two or more target hypervisors using said resource allocation metric values for each of said virtual machines running on said target hypervisor;
comparing said effective priority value for said virtual machine running on said source hypervisor with its effective priority value if it were to be migrated to said target hypervisor for each of said two or more target hypervisors;
generating a set of deltas representing differences in absolute value terms between said effective priority value of said virtual machine running on source hypervisor and its effective priority value if it were to be migrated to run on said target hypervisor for each of said two or more target hypervisors;
determining a minimum delta in said set of deltas;
selecting one of said two or more target hypervisors associated with said minimum delta; and
migrating said virtual machine from said source hypervisor to said selected target hypervisor;
wherein said effective priority value for said virtual machine running on said source hypervisor is computed using the following equation:

$$Ep=((b+0.5e)/n)*100,$$

where Ep corresponds to said effective priority value, b corresponds to a number of said resource allocation metric values calculated for other virtual machines running on said source hypervisor with a value less than said resource allocation metric value calculated for said virtual machine running on said source hypervisor, e corresponds to a number of said resource allocation metric values calculated for said other virtual machines running on said source hypervisor with a value equal to said resource allocation metric value calculated for said virtual machine running on said source hypervisor and n corresponds to a total number of resource allocation metric values calculated for said virtual machines running on said source hypervisor.

8. The system as recited in claim 7, wherein said effective priority value for said virtual machine if it were to be migrated to run on said target hypervisor is computed using the following equation:

$$Ep=((b+0.5e)/n)*100,$$

where Ep corresponds to said effective priority value, b corresponds to a number of said resource allocation metric values calculated for other virtual machines running on said target hypervisor with a value less than said resource allocation metric calculated for said virtual machine, e corresponds to a number of said resource allocation metric values calculated for said virtual machines running on said target hypervisor equal in value to said resource allocation metric calculated for said virtual machine and n corresponds to a total number of resource allocation metric values calculated for said virtual machines running on said target hypervisor and said virtual machine.

9. The system as recited in claim 7, wherein the program instructions of the computer program further comprises:
calculating said effective priority value for said virtual machine running on said source hypervisor using said resource allocation metric values for said virtual machines running on said source hypervisor, a number of virtual machines running on said source hypervisor with a resource allocation metric value equal to and below said virtual machine's resource allocation metric value and said total number of resource allocation metric values calculated for said virtual machines running on said source hypervisor.

10. The system as recited in claim 7, wherein the program instructions of the computer program further comprises:
calculating said effective priority value for said virtual machine if it were to be migrated to run on said target hypervisor using said resource allocation metric values for said virtual machines running on said target hypervisor, a number of virtual machines running on said target hypervisor with a resource allocation metric value equal to and below said virtual machine's resource allocation metric value and a total number of resource allocation metric values calculated for said virtual machines running on said target hypervisor and said virtual machine to be migrated to run on said target hypervisor.

11. The system as recited in claim 7, wherein said source hypervisor resides on a first cloud computing node of a cloud computing environment and said two or more hypervisors reside on two or more other cloud computing nodes of said cloud computing environment.

12. The system as recited in claim 7, wherein said resource comprises one of the following: processing unit, memory and network bandwidth.

* * * * *